United States Patent [19]
Cargill

[11] Patent Number: 5,432,546
[45] Date of Patent: Jul. 11, 1995

[54] WEAPON IMPACT ASSESSMENT SYSTEM

[75] Inventor: Lee B. Cargill, Coronado, Calif.

[73] Assignee: Enel Company, Coronado, Calif.

[21] Appl. No.: 243,162

[22] Filed: May 16, 1994

Related U.S. Application Data

[63] Continuation-in-part of Ser. No. 994,269, Dec. 21, 1992, abandoned.

[51] Int. Cl.$^6$ .................... H04N 7/18; B64D 3/02
[52] U.S. Cl. ................... 348/144; 89/41.05; 244/1 TD
[58] Field of Search ............. 358/109; 244/3.16, 3.19, 244/1 TD, 3; 89/41.05; 348/113, 114, 117, 143, 144

[56] References Cited

U.S. PATENT DOCUMENTS

| | | | |
|---|---|---|---|
| 3,962,537 | 6/1976 | Kearns et al. | 358/109 |
| 4,004,487 | 1/1977 | Eichweber | 89/41.05 |
| 4,290,364 | 9/1981 | Weidenhagen et al. | 358/109 |
| 4,354,419 | 10/1982 | Patterson | 89/1.11 |
| 4,659,034 | 4/1987 | Diekmann | 244/1 TD |
| 4,834,317 | 5/1989 | Deppner | 244/1 TD |
| 5,014,997 | 5/1991 | Smith et al. | 244/1 TD |
| 5,094,405 | 3/1992 | Brum | 244/1 TD |
| 5,102,063 | 4/1992 | Brum | 244/1 TD |

FOREIGN PATENT DOCUMENTS 0466499 1/1992 European Pat. Off. ........... 89/41.05
2244118 11/1991 United Kingdom ............... 89/41.05

OTHER PUBLICATIONS

Ohlhoff, Ernest "*Artillery Launched Television*" Proceedings of Society of Photo-Optical Instrumentation Engineers, SPIE vol. 79, Mar. 1976, Aerial Reconnaissance Systems.

Primary Examiner—Tommy P. Chin
Assistant Examiner—Bryan S. Tung

[57] ABSTRACT

A military weapon system consists of six major components; a weapon that impacts a target from the air, a video sensor/transmitter attached to the weapon, a tow line that connects the weapon and the video sensor/transmitter, a brake assembly, a remote receiver/recorder, and a transmission activation device. Following launch of the weapon by its air or ground based launch apparatus, the video sensor/transmitter is released from the weapon into the air stream surrounding the weapon and immediately moves aft due to aerodynamic drag forces. The tow line and brake assembly restrain the aft movement of the video sensor/transmitter causing it to achieve a position that is aft of and in trail behind the weapon. Immediately following weapon impact, a signal containing video imagery is transmitted to the remote receiver/recorder to enable post strike analysis of the weapon point-of-impact, weapon detonation, and initial target damage.

8 Claims, 4 Drawing Sheets

WEAPON IMPACT ASSESSMENT SYSTEM

This application is a continuation in part to my patent application, Ser. No. 07/994,269 filed on Dec. 21, 1992 entitled, "System For Recording Military Weapon Point-of-Impact & Initial Damage Assessment", now abandoned.

BACKGROUND OF THE INVENTION

1. Field of the Invention

The present invention relates to the real time recording of video data that show the point-of-impact of a military weapon, the weapon's detonation and the initial damage resulting to the target. In the past, there has been a lack of a practical and low-cost method of obtaining this needed data in a timely manner. In daylight conditions with clear weather, pilots have provided reports of their visual observations, the reports being subjective and prone to accentuate the positive. Expensive systems have been available such as reconnaissance aircraft, satellites, and unmanned air vehicles to obtain objective data but even these systems have inherent delays in providing data and are severely limited when clouds obscure a target. In clear weather conditions, aircraft-based video sensors have been employed to record points-of-impact and initial damage resulting from LASER guided bombs. However, systems of this type are impractical for weather conditions in which low clouds are present. Weapons with video sensors and data links provide video data regarding point of weapon impact but do not show weapon detonation, proper function of the fusing, hard target penetration, nor any other target damage information. The present invention solves these problems and provides the military user the capability to record high quality video of a weapon's impact point as well as initial damage resulting from the employment of the weapon.

2. Description of Prior Art

Weapons that have video sensors for terminal guidance to a target have been used by military forces for a number of years. Weidenhagen et al (U.S. Pat. No. 4290364) discloses one such application. Terminal guidance sensors do provide video imagery up to the point of weapon impact but they cannot provide data showing the weapon detonation or target damage.

A towed target designation and acquisition system is described by Patterson (U.S. Pat. No. 4354419) for use by an aircraft flying at a low altitude, thereby increasing aircraft survivability by avoiding detection by enemy radar. The system employs a Forward Looking Infrared sensor and a LASER designator that is housed in a glider that is towed by the aircraft. The glider has a stealthy, high lift-to-drag airframe design and is controlled from the cockpit of the aircraft doing the towing. The glider is thereby positioned between 600 to 4000 feet above the low flying aircraft. This aircraft based system is large, expensive, and not adaptable to weapons released from an aircraft.

Several systems that use TV cameras attached to parachutes have been devised by various inventors, including Kearns et al (U.S. Pat. No. 3962537), Dowries (EP Patent 0466499), and Rutt (UK Patent 2244118), A published article by Ohlhoff titled, "Artillery Launched Television" also discloses a system using this approach. These systems have several deficiencies that limit their usefulness including; parachute drift problems caused by wind in the target area, a wide variation in both picture quality and area of coverage due to the wide variation in distance between the TV camera and target area as the parachute descends from high altitude to low altitude, and susceptibility to transmission signal interference due to the long period of radio transmission of the TV picture as the parachute descends.

Eichweber (U.S. Pat. No. 4004487) describes a ground launched projectile mounted imaging system for target acquisition designed to assist ground personnel in directing subsequent weapons toward acquired targets. It is not designed to provide impact and or damage assessment, and if so employed, would provide a limited capability and be relatively expensive to operate.

All systems disclosed in the prior an have recognized the usefulness of video imagery in modem warfare and attempt to place their respective video sensors at positions needed for their respective system applications. Most of the systems have also used the radio frequency spectrum to transmit the data to the needed remote location. None of the systems, however, provide low cost, tunely, and accurate battle damage information to the on-scene commander of the military forces, the key individual responsible for the execution of the military action. As a result, this deficiency has been cited as one of the major "lessons learned" by the U.S. Department of Defense during the Desert Storm Military Operations.

OBJECTS OF THE INVENTION

The broad object of this invention is to provide a military weapon system capable of providing timely and accurate video data that show the point-of-impact of a weapon, the weapon's detonation and initial damage to a target caused by the weapon.

A further object of the invention is to provide a method of control of the transmission of the data to reduce the probability of signal interference from friendly or hostile forces.

A further object of the invention is to provide a means of obtaining the required video data at night.

A further object of the invention is to accomplish the preceding objectives with a system that is very low cost when compared to existing systems.

SUMMARY OF THE INVENTION

The system consists of six major components; a weapon, a video sensor/transmitter, a tow line that is connected to both the video sensor/transmitter and weapon, a brake assembly, a remote receiver/recorder, and a means for initiating transmission of a video signal from the video sensor/transmitter to the receiver/recorder. The video sensor/transmitter is initially attached to the weapon. Following weapon launch from an apparatus such as an aircraft, unmanned air vehicle or surface-based weapon delivery system, the video sensor/transmitter is released into the air stream surrounding the weapon. Aerodynamic drag forces acting on the video sensor/transmitter cause it to rapidly move aft of the weapon. The aft movement causes the tow line to be deployed. After a predetermined amount of tow line has been deployed, the brake assembly applies a braking force to the tow line which causes the video sensor/transmitter to be accelerated to the speed of the weapon. The video sensor/transmitter thereby achieves a position that is in tow and in trail behind the weapon. The weapon remains in the field of view of the video sensor because the combination of the tension in the tow line and the aerodynamic forces that act upon the sensor/transmitter cause the video sensor/transmitter to point toward the weapon. Immediately following weapon impact and prior to the video sensor/transmitter impact with the ground, the video sensor/transmitter transmits a video signal to the remotely located receiver/recorder to enable post strike analysis. For night missions, an illumination device is also activated immediately following weapon impact. The system is adaptable to a variety of military air-to-surface and surface-to-surface strike weapons including bombs, missiles, and projectiles that are launched from air and surface based weapon launch systems.

BRIEF DESCRIPTION OF THE DRAWINGS

The present invention will be more fully understood by reference to the following detailed description thereof when read in conjunction with the attached drawings, and wherein.

DESCRIPTION OF THE PREFERRED EMBODIMENT

Figure 1:
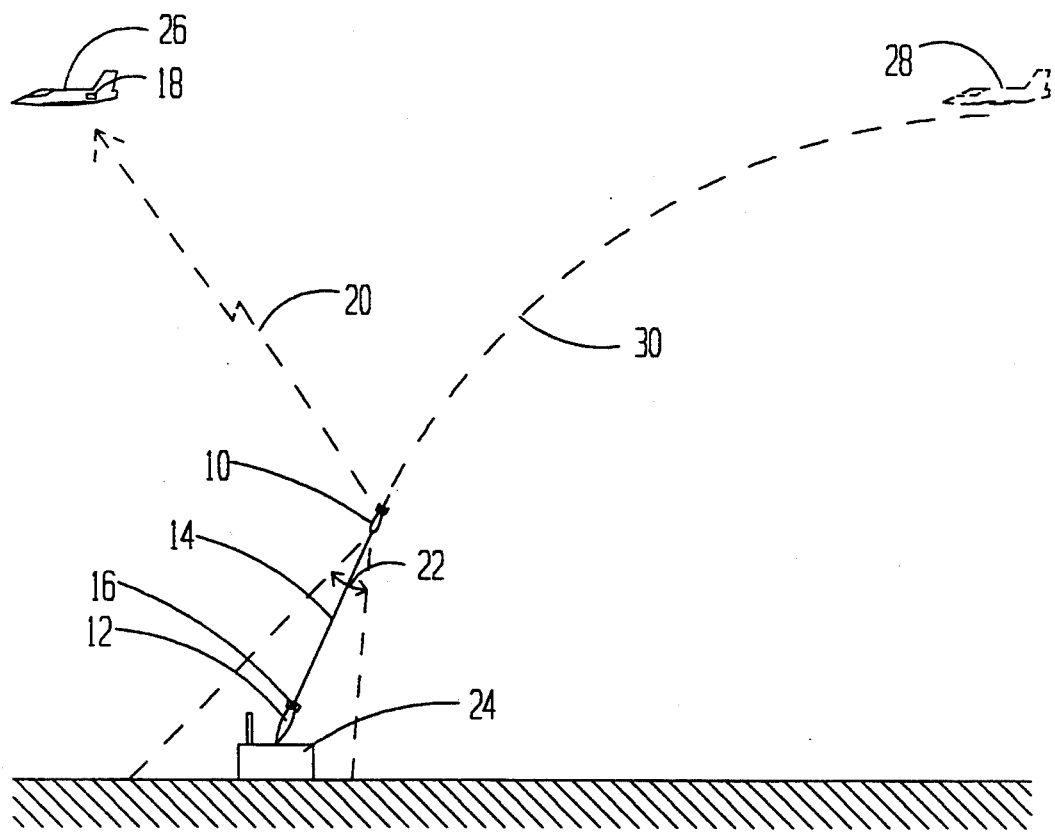
FIG. 1 is a system overview showing the key system components in an air launched weapon application.

FIG. 1 provides an overview of the system showing key system components including; a video sensor/transmitter 10 that is towed behind a weapon 12 at a position that is in trail behind the weapon; a tow line 14 connecting the video sensor/transmitter and the weapon, a brake assembly 16 that is attached to the aft section of the weapon, a remote receiver/recorder 18 that receives and records the transmitted video signal 20 from the sensor/transmitter. Video imagery that is within the video sensor field of view 22 at weapon impact on the target 24 is recorded. In FIG. 1, the receiver/recorder is shown attached to an aircraft 26 that was also the weapon launch apparatus, having previously launched the weapon when it was at the weapon launch position 28. The receiver/recorder could also be located in a support aircraft, unmanned air vehicle, satellite or the like. The trajectory 30 shown in FIG. 1 represents the trajectory of the combined weapon and towed video sensor/transmitter.

The video sensor/transmitter is initially attached to the weapon and remains attached prior to the launch of the weapon by its launch apparatus. Following weapon launch, the video sensor/transmitter is released into the air stream surrounding the weapon. The aerodynamic drag force acting on the video sensor/transmitter causes it to rapidly move aft of the weapon because the drag-to-mass ratio of the video sensor/transmitter is much greater than the weapon. The total drag on the small video sensor/transmitter is a much less than the total drag on the much larger weapon and therefore has minimal effect on the trajectory of the weapon. The aft movement of the video sensor/transmitter causes the tow line to be deployed. After a pre-determined mount of tow line has been deployed, the brake assembly applies a braking force on the tow line remaining to be deployed. This braking force causes the video sensor/transmitter to be accelerated to the speed of the weapon. The video sensor/transmitter thereby achieves a position, relative to the weapon, that is in trail behind the weapon. The weapon remains in the field of view of the video sensor because the combination of the tension in the tow line and the aerodynamic forces that act upon the video sensor/transmitter cause the video sensor/transmitter to point toward the weapon.

The field of view 22 of the video sensor/transmitter and the length of the tow line 14 would be tailored for the specific weapon application and optimized during normal engineering development. In experiments that I have conducted, sensor lenses that provided fields of view of 26 degrees (horizontal)×19 degrees (vertical) and 54 degrees (horizontal)×40 degrees (vertical) have been used with success. Tow line lengths used during successful flight tests have varied from 520 feet to 300 feet with a prototype video sensor/transmitter towed by a practice bomb which impacted the ground at a speed of approximately 300 knots. An appropriate field of view and tow line length will depend primarily on the speed of the weapon. For most weapons, a tow line length of 1000 feet or less is envisaged.

Figure 2:
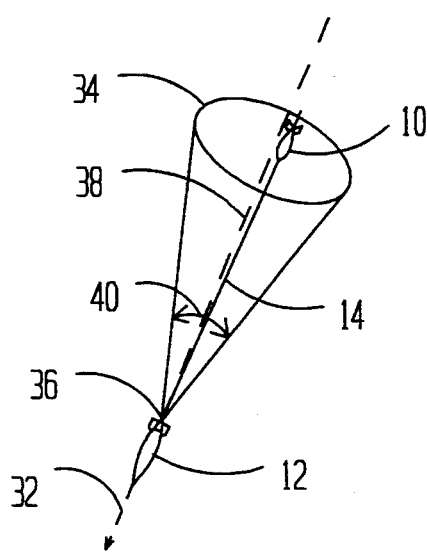
FIG. 2 is an perspective view of the sensor/transmitter in tow behind a weapon.

FIG. 2 provides a perspective view illustrating the relative positions of the video sensor/transmitter 10, tow line 14, weapon 12, the weapon's velocity vector 32, a predetermined cone of movement 34 within which the video sensor/transmitter will normally remain while under tow, the vertex 36 of said cone being located at the tow line connecting point on the weapon and the center axis 38 of the cone being directly in line with the velocity vector of the weapon. The base of this invisible cone of movement is a spherical section with all points on the surface being equidistant from the cone vertex, the distance being equal to the length of the tow line. The angle 40 at the vertex of the cone of movement is in the order of 20 degrees. During initial deployment of the video sensor/transmitter, it might move outside the cone; however, upon completion of the tow line braking action, the video sensor/transmitter would rapidly come back within the cone. In certain instances, the cone might also be exceeded during weapon maneuvering. In any case, the field of view of the video sensor and the predetermined cone of movement would be tailored to the specific weapon and weapon launch system employed to ensure that the weapon is in the field of view of the video sensor at weapon impact.

Figure 3:
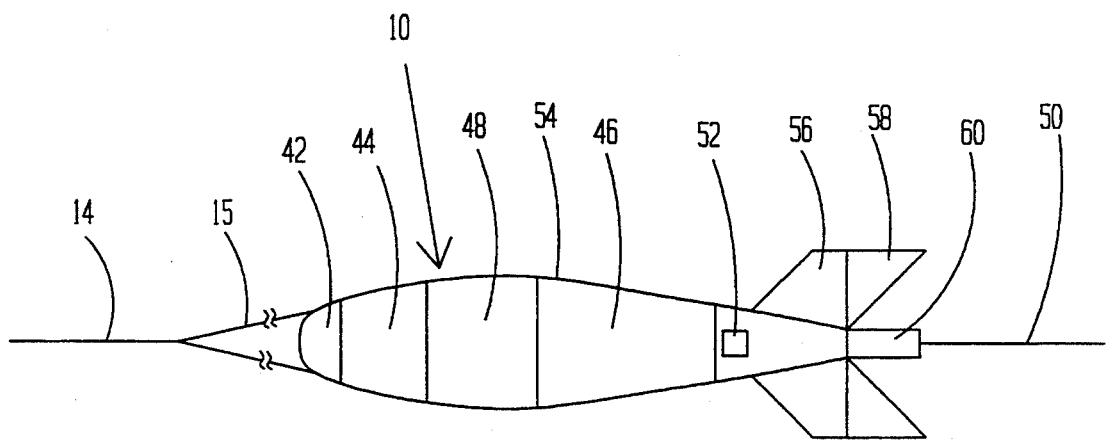
FIG. 3 is an enlarged functional diagram of the video sensor/transmitter showing its key components.

FIG. 3 is an enlarged functional diagram of the video sensor/transmitter 10 showing the attached tow line 14, a tow line bridle 15 that connects the tow line to the sensor/transmitter, a lens 42, a video sensor 44 that contains the sensing element and associated video signal processing electronics, a radio frequency transmitter 46 that receives the output from the video sensor, adds a sensor/transmitter unit identifier, and provides modulation and amplification of the signal for radio frequency transmission, a power supply 48 that provides electrical power to the video sensor/transmitter components, a transmit antenna 50, a transmission activation device 52 that causes the sensor/transmitter to initiate transmission, an aerodynamic shaped housing 54 that provides environmental protection to and mounting points for enclosed components, fins 56 for longitudinal and directional stability, a roll inhibiting device 58, and an illumination device 60 for night missions. The aerodynamic shaped housing, fins and roll inhibiting device together provide sufficient stability for the video sensor to acquire usable imagery. The fins used in my prototype system totaled 4 in number and were positioned at 90 degree intervals about the longitudinal axis. The fins and the external shape of the housing were also symmetrical about the longitudinal axis. Fin and housing external shape symmetry about the longitudinal axis is also envisaged in production systems to provide the video sensor/transmitter with low lift-to-drag characteristics and thereby enabling it to trail the weapon at a position near the center axis of the cone of movement. A production video/sensor transmitter would be appropriately packaged for the specific weapon and weapon launch apparatus employed.

The video sensor/transmitter is both small in size and light weight. My prototype units that have been successfully flight tested had a housing with a maximum cross section diameter of 2.5 inches, a housing length of 10 inches, and a weight of 16 ounces. Production video sensor/transmitter units may be smaller and lighter and would be tailored to the specific weapon and weapon launch apparatus employed.

Figure 4:
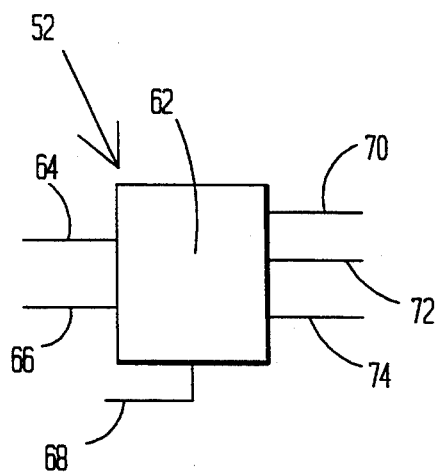
FIG. 4 is a functional diagram of the transmission activation device.

FIG. 4 is a functional diagram of the transmission activation device 52 comprised of; a switch 62 that has video signal input 64 received from the transmitter, an electrical input 66 from the power supply, and a tow line tension input 68 that can be either mechanical or electrical, depending on a specific design configuration. Outputs from the switch consist of a video signal output to a dummy load 70, a video signal output to the transmit antenna 72, and an electrical output to the illumination device 74. As soon as electrical power is supplied to the video sensor/transmitter, video signal and electrical inputs to the switch are present. The switch is designed so that when there is a tension force on the tow line, the only output from the switch is the video signal output to the dummy load, thereby inhibiting both video signal transmission and activation of the illumination device. When there is no tension on the tow line, the switch inhibits the video signal output to the dummy load and completes the routing of both the video signal to the transmit antenna and the electrical signal to the illumination device. The functioning of the switch in this manner thereby provides for video signal transmission that commences a few milliseconds after weapon impact and continues until the video sensor/transmitter impacts the ground, the total transmission time being approximately one second or less and thereby reducing vulnerability to interference from friendly or hostile transmissions. This enables several video sensor/transmitters to be employed on a single frequency radio channel, so long as the individual weapons impact the ground at intervals of one second or greater, thereby reducing both system cost and complexity. Additionally, the illumination device receives its signal precisely when needed, at a predetermined distance from the target. A variety of specific switch designs could be incorporated to provide the functions described.

Figure 5:
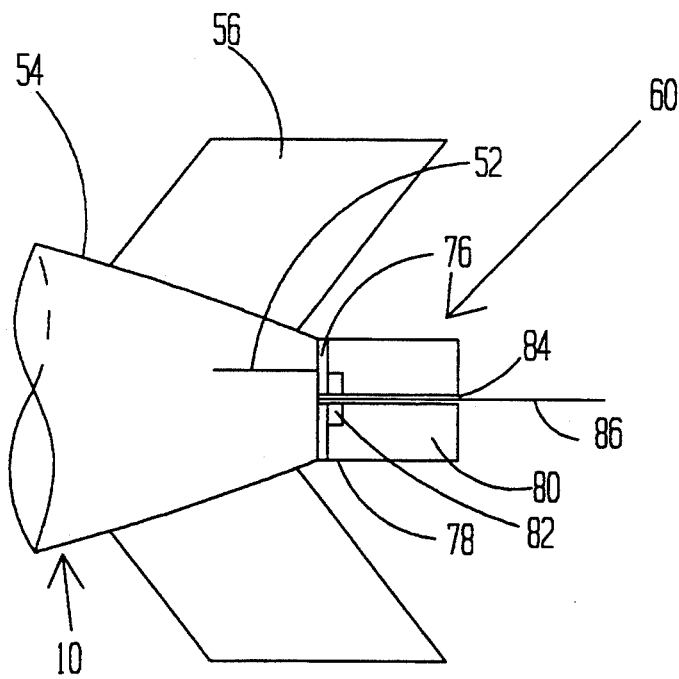
FIG. 5 is an enlarged functional diagram of the illumination device showing its key components.

FIG. 5 is an enlarged functional diagram of the illumination device 60 showing its key components. The device is attached to the aft section of the video sensor/transmitter housing 54, aft of the fins 56, and is comprised of an attachment/release mechanism 76, a casing 78 that encapsulates and provides environmental protection to a pyrotechnic charge 80, and an ignition cap 82 contained within the casing. Shown in FIG. 5 is an example of a casing with an axial opening 84 through which extends a trailing monopole transmit antenna 86. Upon receiving the signal from the transmission activation device 52, the attachment/release mechanism releases the casing into the surrounding air stream. The ignition cap is then activated, either mechanically or electrically, and ignites the pyrotechnic charge that creates the illuminating light. A light duration in the order of 0.2 seconds is envisaged, thereby enabling the illumination device to be small and providing sufficient illumination time for approximately 6 frames of a TV video image. The key benefit of this illumination device is that enables the pyrotechnic light to be positioned when and where needed for effective illumination of the target. The detail design features of the illumination device including its size, shape, etc. would be tailored for a specific weapon application in a normal engineering development process and would using existing technologies.

Figure 6:
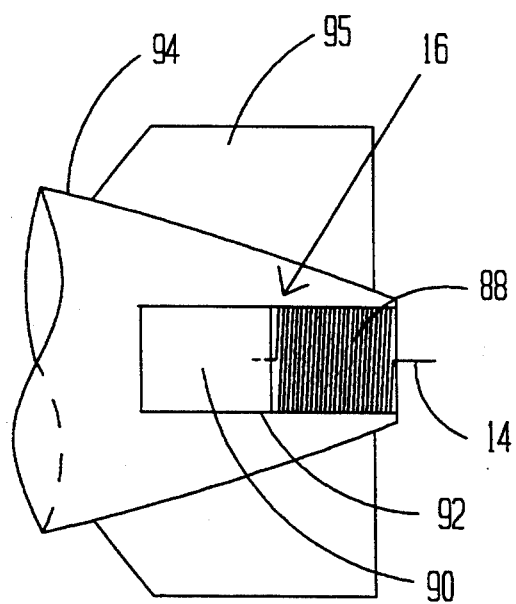
FIG. 6 is a functional diagram of the brake assembly.

FIG. 6 is a functional diagram of the brake assembly 16 consisting of; a chamber 88 that contains free running tow line 14 that must be deployed prior to the commencement of the braking action, a brake mechanism 90 that contains the remainder of the tow line and brake, and a housing 92 that encapsulates the brake assembly components and interfaces with the weapon. In most general purpose bombs, a hole exists in the tail cone that is centered on the longitudinal axis in the after-most section of the tail. FIG. 6 shows the brake assembly placed in such a hole in the tail cone 94 between the bomb fins 95 The brake assembly could be mounted in other locations also and its detail design would be tailored to a specific weapon application.

Figure 7:
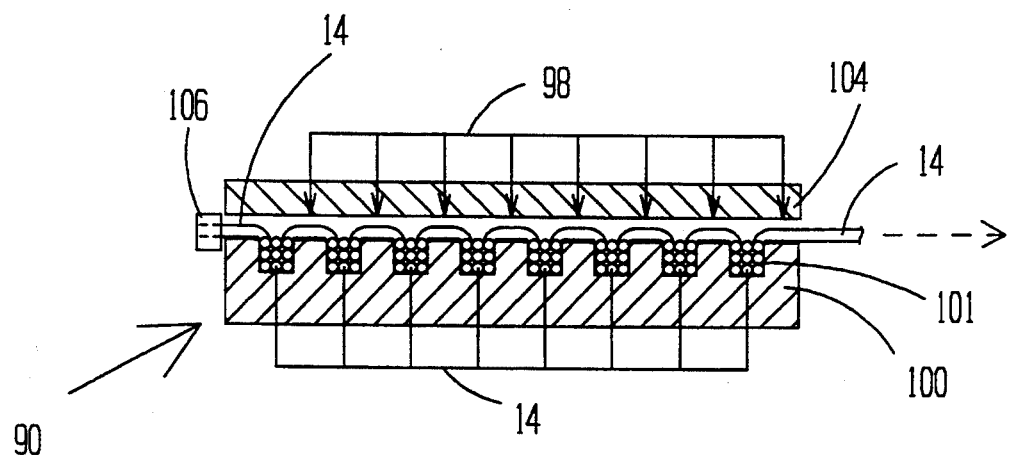
FIG. 7 shows the tow line brake mechanism.

FIG. 7 illustrates the brake mechanism 90 that applies the braking force on the tow line and thereby restrains the aft movement, relative to the weapon, of the video sensor/transmitter. The brake mechanism consists of one section that has grooves 100, another section that is positioned adjacent to the grooves 104, tow line 14, a portion of which is initially placed within the brake mechanism as shown, and a tow line anchor 106. The purpose of the groves is to provide room for placement of predetermined mounts of wrapped or wound continuous tow line 14. When the two sections are mechanically pressed against each other, several fiction surfaces 98 are formed that perform their function when the video sensor/transmitter is deployed and all of the free running tow line has been pulled out. The tow line experiences an initial tension force as the tow line starts to be pulled out of the first groove 101 and is resisted by the first friction surface. Upon pulling out all of the tow line in the first groove, the second friction surface also becomes effective as line is pulled out of the second groove, providing additional friction force and thereby increasing the total tension force on the tow line. This process continues on down the line with the line tension increasing as subsequent grooves are emptied of their line. A tow line anchor 106 restrains the tow line from pulling completely out. The net effect of this design approach to the brake mechanism is to create a tailored series of step increases of tow line tension that, when plotted as tension force vs. time, approximates a ramp function and keeps the tow line from breaking as it accelerates the towed video sensor/transmitter to the speed of the weapon doing the towing. The tow line brake mechanism can accommodate a variety of forms. Additionally, the number and spacing of the grooves can be designed to be compatible with the specific weapon and launch apparatus employed.

Figure 8:
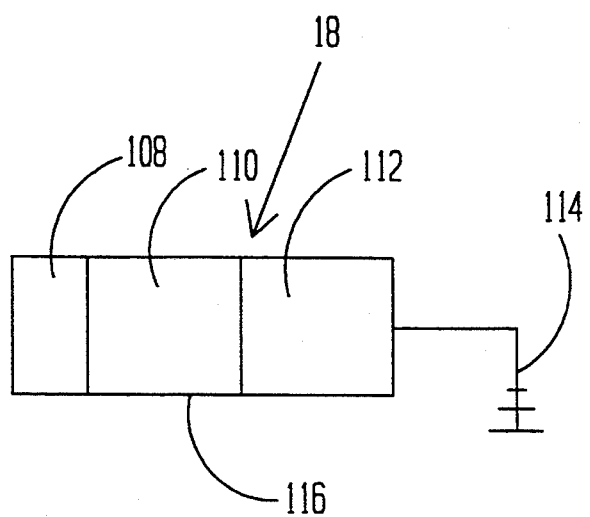
FIG. 8 is an enlarged functional diagram of the remote receiver/recorder showing its key components.

FIG. 8 is an enlarged functional diagram of the remote receiver/recorder 18 showing its components and subsystems that include; a power supply 108 that receives electrical power from a battery, wind driven generator, or power from its host system (i.e., aircraft, unmanned air vehicle, remote ground station, etc.), a video recorder assembly 110 that records the video signal received from the receiver for playback at an appropriate time, a receiver 112 that detects the signal received from the receiver antenna 114, and a housing assembly 116 that provides environmental protection and mounting for the components contained within. The specific receiver/recorder design would be tailored for the specific system to which the receiver/recorder is to be attached.

MODE OF OPERATION OF THE INVENTION

The system can be adapted to a variety of weapon types and weapon delivery systems. FIG. 1 illustrates the mode of operation when a single weapon is released from a tactical aircraft. The system can also be adapted for use in a multiple weapon release mode. This can be accomplished by either timing the release of weapons so that their individual video sensor/transmitters that are operating on the same radio frequency do not interfere with each other, or by providing different radio frequencies to simultaneously released weapons. During daytime operations, it may be cost effective to provide a single video sensor/transmitter for a group of bombs, placing the video sensor/transmitter on one of the bombs in the group and transmitting the video signal prior to the impact of the first bomb. This would require that the transmission activation device be appropriately modified.

The system could also be applied to ground launched munitions. However, in this mode, the antenna for the receiver/recorder must be positioned so as to provide for a clear line-of-sight between the video sensor/transmitter antenna and receiver/recorder antenna. It is envisaged that a moored balloon would be used to elevate the antenna. Alternate methods of elevating the receiver/recorder antenna might include kites or unmanned air vehicles.

I claim:

1. A system for recording video imagery of a military weapon point-of-impact on a target, the detonation of the weapon, and initial damage to the target, comprising:
    a weapon capable of impacting a target from the air when the weapon is released from a launching apparatus,
    a video sensor/transmitter for obtaining video imagery, said video sensor/transmitter being initially attached to the weapon and subsequently being released into the air stream surrounding the weapon following the release of the weapon from its launching apparatus,
    a tow line for connecting the video sensor/transister directly to the rear of said weapon video and dragging said sensor/transmitter within a predetermined cone of movement travelled by said video sensor/transmitter, the predetermined cone of movement located aft of and in trail behind said weapon, the vertex of said predetermined cone of movement being located at the point where the tow line connects to the weapon and the center axis of said predetermined cone of movement being aligned with the velocity vector of the weapon,
    a brake assembly attached to the weapon for providing a braking force on the tow line thereby accelerating the video sensor/transmitter to the speed of the weapon,
    a remote receiver/recorder for receiving and recording a video signal transmitted by the video sensor/transmitter and enabling the analysis of the weapon point-of-impact, detonation and initial damage assessment; and
    a means for initiating a video transmission signal to the remote receiver/recorder.

2. The system of claim 1 wherein the angle the said vertex said predetermined cone of movement is in the order of 20 degrees.

3. The system of claim 2 wherein the video sensor/transmitter comprises: a lens, a video sensor, a transmitter that includes a sensor/transmitter unit identifier feature, a power supply, an antenna, a transmission activation device, a housing, fins for longitudinal and directional stability, a roll inhibiting device, and an illumination device.

4. The system of claim 2 wherein said brake assembly includes a brake mechanism that provides braking force on the tow line by routing wound or wrapped sections of tow line through a series of friction surfaces, thereby creating a tailored series of step increases of tow line tension that keeps the tow line from breaking as it accelerates the towed video sensor/transmitter to the speed of the weapon doing the towing.

5. The system of claim 2 wherein said means for initiating a video transmission signal to the remote receiver/recorder is a transmission activation device that inhibits video signal routing to a transmit antenna until it receives an input indicating that there is a lack of tension in the tow line due to weapon impact.

6. The system of claim 2 wherein an illumination device having a pyrotechnic charge is released from the video sensor/transmitter into the air stream and ignited, thereby creating a pyrotechnic light of sufficient intensity and duration to enable a video sensor to detect a target at night.

7. The system of claim 6 wherein said illumination device activated upon receiving a signal indicating that there is a lack of tension in the tow line due to weapon impact, thereby enabling the pyrotechnic light to be actuated when and where needed for effective illumination of the target.

8. A system for recording video imagery of a military weapon point-of-impact on a target, the detonation of the weapon, and initial damage to the target, comprising:
    a weapon capable of impacting a target from the air when the weapon is released from a launching apparatus,
    a video sensor/transmitter for obtaining video imagery, said video sensor/transmitter being initially attached to the weapon and subsequently being released into the air stream surrounding the weapon following the release of the weapon from its launching apparatus,
    a tow line for connecting the video sensor/transmitter directly to the rear of said weapon video and dragging said sensor/transmitter within a predetermined cone of movement travelled by said video sensor/transmitter, the predetermined cone of movement located aft of and in trail behind said weapon, the vertex of said predetermined cone of movement being located at the tow line as connects to the weapon, the angle at said vertex of said predetermined cone of movement being generally no more than 20 degrees, and the center axis of the predetermined cone of movement being aligned with the velocity vector of the weapon, a brake assembly attached to the weapon for providing a braking force on the tow line thereby accelerating the video sensor/transmitter to the speed of the weapon, a remote receiver/recorder for receiving and recording a video signal transmitted by the video sensor/transmitter and enabling the analysis of the weapon point-of-impact, detonation and initial damage assessment, a means for initiating said video signal transmission, and a pyrotechnic illumination device releasable immediately after weapon impact and mounted on the aft end of the video sensor/transmitter.

* * * * *